(12) United States Patent
Rasmussen et al.

(10) Patent No.: US 8,005,613 B2
(45) Date of Patent: *Aug. 23, 2011

(54) GENERATING, STORING, AND DISPLAYING GRAPHICS USING SUB-PIXEL BITMAPS

(75) Inventors: Jens Eilstrup Rasmussen, San Francisco, CA (US); Lars Eilstrup Rasmussen, Fairlight (AU)

(73) Assignee: Google Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/511,842

(22) Filed: Jul. 29, 2009

(65) Prior Publication Data
US 2009/0287797 A1 Nov. 19, 2009

Related U.S. Application Data

(60) Division of application No. 11/687,168, filed on Mar. 16, 2007, now Pat. No. 7,570,828, which is a continuation of application No. 11/088,677, filed on Mar. 23, 2005, now Pat. No. 7,209,148.

(60) Provisional application No. 60/567,946, filed on May 3, 2004, provisional application No. 60/555,501, filed on Mar. 23, 2004.

(51) Int. Cl.
*G01C 21/30* (2006.01)
(52) U.S. Cl. .................................. 701/208; 340/995.14
(58) Field of Classification Search .................. None
See application file for complete search history.

(56) References Cited

U.S. PATENT DOCUMENTS

| | | | |
|---|---|---|---|
| 4,972,319 A | 11/1990 | Delorme |
| 5,051,928 A | 9/1991 | Gruters |
| 5,559,707 A | 9/1996 | DeLorme et al. |
| 5,613,051 A | 3/1997 | Iodice et al. |
| 5,646,751 A | 7/1997 | Motamed et al. |
| 5,737,533 A | 4/1998 | de Hond |
| 5,802,492 A | 9/1998 | DeLorme et al. |
| 5,848,373 A | 12/1998 | DeLorme et al. |
| 5,910,805 A | 6/1999 | Hickey et al. |
| 6,002,809 A | 12/1999 | Feig et al. |
| 6,031,963 A | 2/2000 | Kitamura et al. |
| 6,054,990 A | 4/2000 | Tran |

(Continued)

FOREIGN PATENT DOCUMENTS

JP 61-135270 A 6/1986

(Continued)

OTHER PUBLICATIONS

Canadian Office Action, Canadian Patent Application No. 2,560,558, Aug. 7, 2009, 3 pages.

(Continued)

*Primary Examiner* — Andrew Wang
*Assistant Examiner* — David H Chu
(74) *Attorney, Agent, or Firm* — Fenwick & West LLP (57) ABSTRACT

Techniques for generating, storing and displaying graphics on computer systems are disclosed. The type of graphics in particular are images, where the image can be defined as a set of areas, whether these areas are lines, geometric shapes, letters or other types of areas. The effect of using these methods is that graphics, such as digital maps, can be handled faster, with more flexibility and with higher display quality, both for screen use and for printing.

7 Claims, 4 Drawing Sheets

U.S. PATENT DOCUMENTS

| | | |
|---|---|---|
| 6,098,015 A | 8/2000 | Nimura et al. |
| 6,167,382 A | 12/2000 | Sparks et al. |
| 6,182,010 B1 | 1/2001 | Berstis |
| 6,199,014 B1 | 3/2001 | Walker et al. |
| 6,208,934 B1 | 3/2001 | Bechtolsheim et al. |
| 6,252,608 B1 | 6/2001 | Snyder et al. |
| 6,262,741 B1 | 7/2001 | Davies |
| 6,266,614 B1 | 7/2001 | Alumbaugh |
| 6,278,938 B1 | 8/2001 | Alumbaugh |
| 6,321,158 B1 | 11/2001 | DeLorme et al. |
| 6,522,336 B1 | 2/2003 | Yuasa |
| 6,826,472 B1 | 11/2004 | Kamei et al. |
| 7,054,741 B2 | 5/2006 | Harrison et al. |
| 7,136,915 B2 | 11/2006 | Rieger, III |
| 7,210,119 B2 | 4/2007 | Pothos et al. |
| 7,260,474 B1 | 8/2007 | Thayathil et al. |
| 7,353,034 B2 | 4/2008 | Haney |
| 7,373,244 B2 | 5/2008 | Kreft |
| 7,451,041 B2 | 11/2008 | Laumeyer et al. |
| 7,542,882 B2 | 6/2009 | Agrawala et al. |
| 7,565,240 B2 | 7/2009 | Tomizawa |
| 7,580,045 B2 | 8/2009 | Harrison et al. |
| 7,610,219 B2 | 10/2009 | Sayed |
| 7,617,296 B2 | 11/2009 | Bank |
| 2001/0034661 A1 | 10/2001 | Ferreira |
| 2001/0044837 A1 | 11/2001 | Talib et al. |
| 2002/0002478 A1 | 1/2002 | Swart et al. |
| 2002/0067353 A1 | 6/2002 | Kenyon et al. |
| 2002/0095328 A1 | 7/2002 | Swart et al. |
| 2002/0099613 A1 | 7/2002 | Swart et al. |
| 2002/0159657 A1 | 10/2002 | DeLorme |
| 2003/0038845 A1 | 2/2003 | Okamura |
| 2003/0041087 A1 | 2/2003 | Pothos et al. |
| 2003/0050065 A1 | 3/2003 | Alletson et al. |
| 2003/0061211 A1 | 3/2003 | Shultz et al. |
| 2003/0078897 A1 | 4/2003 | Florance et al. |
| 2003/0182052 A1 | 9/2003 | DeLorme et al. |
| 2003/0220734 A1 | 11/2003 | Harrison et al. |
| 2004/0128215 A1 | 7/2004 | Florance et al. |
| 2004/0153434 A1 | 8/2004 | Cogen et al. |
| 2005/0065856 A1 | 3/2005 | Roberts et al. |
| 2005/0131634 A1 | 6/2005 | Ignatin |
| 2005/0171686 A1 | 8/2005 | Davis |
| 2005/0216287 A1 | 9/2005 | Crosby et al. |
| 2005/0216448 A1 | 9/2005 | Talib et al. |
| 2005/0246487 A1* | 11/2005 | Ergan et al. ............ 711/113 |
| 2005/0246627 A1 | 11/2005 | Sayed |
| 2005/0270299 A1 | 12/2005 | Rasmussen et al. |
| 2005/0270311 A1 | 12/2005 | Rasmussen et al. |
| 2006/0123053 A1 | 6/2006 | Scannell |
| 2006/0173841 A1 | 8/2006 | Bill |
| 2006/0200383 A1 | 9/2006 | Artunian et al. |
| 2006/0241859 A1 | 10/2006 | Kimchi et al. |
| 2007/0010942 A1 | 1/2007 | Bill |
| 2007/0022007 A1 | 1/2007 | Lawe |
| 2007/0050340 A1 | 3/2007 | Von Kaenel et al. |
| 2007/0073583 A1 | 3/2007 | Grouf et al. |
| 2007/0073584 A1 | 3/2007 | Grouf et al. |
| 2007/0100801 A1 | 5/2007 | Celik et al. |
| 2007/0100802 A1 | 5/2007 | Celik |
| 2007/0100867 A1 | 5/2007 | Celik et al. |
| 2007/0106468 A1 | 5/2007 | Eichenbaum et al. |
| 2007/0156524 A1 | 7/2007 | Grouf et al. |
| 2007/0156525 A1 | 7/2007 | Grouf et al. |
| 2007/0179867 A1 | 8/2007 | Glazer et al. |
| 2007/0192189 A1 | 8/2007 | Popowich et al. |
| 2007/0203643 A1 | 8/2007 | Ramaswamy et al. |
| 2007/0239348 A1 | 10/2007 | Cheung |
| 2007/0244753 A1 | 10/2007 | Grouf et al. |
| 2007/0265858 A1 | 11/2007 | Pansari et al. |
| 2008/0027642 A1 | 1/2008 | Winberry et al. |
| 2008/0040212 A1 | 2/2008 | Grouf et al. |
| 2008/0052150 A1 | 2/2008 | Grouf et al. |
| 2008/0052151 A1 | 2/2008 | Xie et al. |
| 2010/0185514 A1 | 7/2010 | Glazer et al. |

FOREIGN PATENT DOCUMENTS

| | | |
|---|---|---|
| JP | 2000-029448 A | 1/2000 |
| JP | 2002-032280 A | 1/2002 |
| JP | 2003-208597 A | 7/2003 |
| WO | WO 00/39755 | 7/2000 |

OTHER PUBLICATIONS

Second Office Action of China State Intellectual Property Office, Chinese Patent Application No. 200580013512.0, Oct. 23, 2009, 8 pages.

First Office Action of China State Intellectual Property Office, Chinese Patent Application No. 200580013912.1, Aug. 28, 2009, 16 pages.

Examination Report for European Patent Application No. EP 05726046.5, Apr. 23, 2010, 4 Pages.

Notice of Grounds for Rejection, Japanese Patent Application No. P2007-505107, May 18, 2010, 6 Pages.

Supplementary European Search Report for European Patent Application No. EP05713028, Sep. 6, 2010, 3 Pages.

Communication pursuant to Article 94(3) EPC, for European Patent Application No. EP05729642, Oct. 8, 2010, 6 Pages.

Supplementary European Search Report, European Patent Application No. EP 05729642, May 12, 2010, 5 Pages.

Office Action for U.S. Appl. No. 12/573,698, May 17, 2010, 6 Pages.

"Paid Search" Webopedia, 2010, 1 page, can be retrieved online at <URL:www.webopedia.com/TERM/P/paid_search.html>.

Brenner, C., et al., "Extracting Landmarks for Car Navigation Systems Using Existing GIS Databases and Laser Scanning," ISPRS Archives, Sep. 2003, 6 Pages, vol. XXXIV, Part 3/W8.

Burnett, G.E., ""Turn right at the King's Head" Drivers' requirements for route guidance information," A Doctoral Thesis of Loughborough University, Nov. 1998, 341 pages, [online] [retrieved on Feb. 22, 2010], Retrieved from the internet <URL: http://dspace.mit.edu/handle/1721.1/14225>.

Burnett, G.E., "Turn right at the traffic lights" The requirement for landmarks in vehicle navigation systems, The Journal of Navigation, 2000, p. 499-510, vol. 53 No. 3.

Davis, J.R., "The Back Seat Driver: Real Time Spoken Driving Instructions," IEEE, 1989, pp. 146-150.

Yamaichi, R., "We can see web business models of the Windows 2000 era! Backside of Exchange2000 (Café www.exchange2000j.com)", BackOffice World, Oct. 1, 2000, pp. 91-97 vol. 3, IDG Japan. (With English Summary).

Second Office Action of China State Intellectual Property Office, Chinese Patent Application No. 200580013912.1, Nov. 22, 2010, 8 pages.

* cited by examiner

Start with source P. Use that source for 2 pixels. Transition to W for 3 pixels, with weights 1, 4 and 10. Use that source for 3 pixels.

GENERATING, STORING, AND DISPLAYING GRAPHICS USING SUB-PIXEL BITMAPS

RELATED APPLICATIONS

This application is a divisional of U.S. application Ser. No. 11/687,168, filed on Mar. 16, 2007, which is a continuation of U.S. application Ser. No. 11/088,677, filed on Mar. 23, 2005, which claims the benefit of U.S. Provisional Application Nos. 60/567,946, filed May 3, 2004, and 60/555,501, filed Mar. 23, 2004. In addition, this application is related to U.S. application Ser. No. 11/051,534, filed Feb. 5, 2005, titled "A Digital Mapping System", now U.S. Pat. No. 7,158,878. In addition, this application is related to U.S. application Ser. No. 11/088,542, filed Mar. 23, 2005, titled "Generating and Serving Tiles in a Digital Mapping System". Each of these applications is herein incorporated by reference in its entirety.

FIELD OF THE INVENTION

The invention relates to graphics, and more particularly, to generating, storing and displaying graphics in a digital environment, such as a digital mapping system.

BACKGROUND OF THE INVENTION

Digital graphics are associated with a number of processing issues, ranging from the speed and flexibility with which the graphics can be handled (e.g., generated, stored, and otherwise manipulated), to the quality that such graphics can be displayed (e.g., for screen use or for printing). A typical application where such graphics issues come to light is in digital mapping systems.

Computerized mapping systems have been developed to search for, identify, and discover information about geographic locations. One form of such computerized mapping systems includes travel-planning Internet websites. With an excess of 50 million unique monthly users, such map sites are a very popular offering. Examples of such sites include AOL's MapQuest, Yahoo's Telcontar-based maps, and Microsoft's MapPoint.net suite. Such sites all work along the lines of a common model, as will now be described.

When a Web user asks for a new map view (e.g., by entering a postal address, or by clicking a navigation link next to a current map view), the user's Web browser sends to a Web server a request indicating the boundaries of the new map view. The Web server in turn extracts the corresponding vector-based map data from a database, and draws a bitmap image of the map. The server then converts the bitmap to an image format supported by the user's Web browser and returns the image, sometimes embedded in HTML, to the user's Web browser so that it can be displayed. Other map Web sites, such as Britain's MultiMaps or Australia's WhereIs utilize a raster-based map database instead. In these cases, it is not necessary to extract vectors and draw a map image. Rather, these functions are replaced by simply extracting the appropriate part of a larger, pre-rendered image.

Whether vector-based or raster-based, these existing systems typically exhibit very poor performance. In particular, the resulting maps tend to be small and move slowly. Consider, for example, the simple task of panning an existing map view west by, say, 50% of the width of the view. Conventional systems typically produce an entirely new image and transmit the new image from the server to the user's browser. Such systems are wasteful, as they fail to recognize and exploit the 50% overlap between the new and old map views. In the vector-based case, the addition need to produce a map image from vectors in real-time tends to result in maps that are generally hard to read and lack a professional look and feel, thereby detracting from the user experience. In addition, the quality that such map graphics can be displayed (e.g., for screen use or for printing) is generally poor.

Other vendors have chosen to write custom software for their users to download and install. While this latter approach can result in a dramatic improvement in the user experience, the need to install software on a user's computer may prevent its widespread adoption. Moreover, the quality of the resulting map graphics remains a problem.

What is needed, therefore, are digital mapping techniques that facilitate the efficient online delivery of aesthetically pleasing maps. In a more general sense, there is a need for generating, storing, and displaying graphics using sub-pixel bitmaps.

SUMMARY OF THE INVENTION

One embodiment of the present invention provides a method for generating sub-pixel bitmaps. The method includes, for each pixel in the sub-pixel bitmap, determining which colors cover parts of the pixel, and by how much. The method further includes storing color information for each pixel of the sub-pixel bitmap. Storing color information for each pixel of the sub-pixel bitmap may include, for example, using run-length encoding to store the color information for each pixel of the sub-pixel bitmap, as alternating sequences of single color pixels and multi-color pixels. Color for a pixel with more than one source can be calculated, for example, based on the colors that cover parts of the pixel, weights assigned to those colors to indicate by how much the color covers the pixel, and a display gamma value. The method may include using a supplemental printing tile to provide a higher resolution bitmap without anti-aliasing, as compared to the sub-pixel bitmap, to enable high resolution printing. The method may include reducing the number of colors per pixel (e.g., for purposes of making storage more efficient).

Another embodiment of the present invention provides a method for generating sub-pixel bitmap (e.g., for use in a tile-based digital mapping system). This particular method includes assigning a unique color for each source in a graphic (e.g., map) to be created at a desired resolution. The method continues with drawing a bitmap of the graphic at a higher resolution than the desired resolution, wherein each sub-pixel bitmap pixel corresponds to an N×M pixel area in the higher resolution drawing. Note that N and M can be equal, but they need not be. For each of the N×M pixel areas in the higher resolution drawing, the method continues with counting the number of pixels associated with each source. For each sub-pixel bitmap pixel, the method continues with storing related source information and any corresponding weights, wherein a weight is used to indicate impact of a source on a sub-bitmap pixel. The method further includes representing the sub-pixel bitmap pixels using run-length encoding that indicates alternating sequences of single source pixels and mixed source pixels included in the higher resolution drawing. Storing related source information and any corresponding weights may include, for example, generating a color table that includes source colors and combinations of those source colors. Other color storage structures can be used as well.

In one such embodiment, storing related source information and any corresponding weights includes assigning a priority to each source (to indicate relevance of the corresponding source), and reducing the number of sources per sub-pixel bitmap pixel to two, based on the assigned priorities. In one such case, storing related source information and any corresponding weights further includes dividing the sub-pixel bitmap into tiles of a pre-determined size, and for each line of pixels within each tile, storing related source information and any corresponding weights. The pre-determined size of the tiles can be, for example, in the range of 128×128 pixels to 512×512 pixels. The sources and weights can be represented with B bits each and sequence lengths can be represented with B or C bits (e.g., B=4 and C=8). In one such case, the method further includes representing each line in the sub-pixel bitmap based on changes from a previous line. Reducing the number of sources per sub-pixel bitmap pixel to two can be carried out, for example, by selecting the two most relevant sources (e.g., based on assigned priority and how many pixels within the higher resolution drawing those sources cover), and changing the rest of the sources to one of the two selected sources, so that a balance between the two selected sources is maintained as closely as possible.

The method may further include defining which sources are used for text, and setting a threshold that defines how long a source transitioning into a text source can be the only source while still being considered part of the same transition. In one such case, the threshold is chosen based on the nature of the sub-pixel bitmap, including lengths of single source pixel sequences and lengths of transitions. One or more of the sources may include information about at least one of time, pixel position, and external data that can be used in deciding a color for the source. The method may include changing the sources used to at least one of display, print, and convert the sub-pixel bitmaps. This allows, for instance, features to be hidden or highlighted.

The method may include generating a supplemental printing tile with the sub-pixel bitmap tiles, the supplemental printing tile containing information for each pixel in the sub-pixel bitmap that has references to more than one source, the information describing which part of the pixel is defined by which source. In this particular embodiment, the method continues with combining a map tile with a corresponding supplemental printing tile to provide a higher resolution bitmap without anti-aliasing, which can be used for high resolution printing.

Another embodiment of the present invention provides a sub-pixel bitmap tile serving system configured to serve tiles in response to requests from a user. The system includes a plurality of front end tile servers for serving one or more sub-pixel bitmap tiles requested by a user. A request distributor is used for distributing requests for sub-pixel bitmap tiles between the plurality of front end tile servers. A plurality of back end tile servers are communicatively coupled with the plurality of front end tile servers, each back end tile server having access to the sub-pixel bitmap tiles, and configured to provide requested sub-pixel bitmap tiles to a corresponding front end tile server.

In one such embodiment, the user uses a processing device to request sub-pixel bitmap tiles, and the system is configured to cache sub-pixel bitmap tiles on the processing device. In another such embodiment, the system is configured to pre-fetch sub-pixel bitmap tiles, so that tiles needed to draw a requested graphic represented by one or more sub-pixel bitmap tiles, as well as a number of sub-pixel bitmap tiles surrounding the requested graphic within a pre-determined distance, are served to a user. In this particular case, the sub-pixel bitmap tiles associated with one or more zoom levels can also be pre-fetched and served. The user may use a processing device to request sub-pixel bitmap tiles, and pre-fetched tiles can be cached one the processing device. Sub-pixel bitmap tiles that are least likely to be used, based on established criteria, can be deleted from the cache. In one particular case, caching sub-pixel bitmap tiles includes caching a set of adjacent tiles a single file, where index information associated with that file is stored separately.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF THE INVENTION

Techniques for generating, storing and displaying graphics on computer systems are disclosed. The type of graphics in particular are images, where the image can be defined as a set of areas, whether these areas are lines, geometric shapes, letters or other types of areas. The effect of using these methods is that graphics, such as digital maps, can be handled faster, with more flexibility and with higher display quality, both for screen use and for printing.

General Overview

A bitmap is a representation of an image based on pixels organized in rows and columns, where each pixel is represented by a set of bits that either directly or indirectly defines the pixel color. A sub-pixel bitmap is a way of representing an image so that the information defining each pixel contains references to one or more sources. In a normal bitmap, each pixel contains either a color or a color number pointing to a color in a color table (or other color identification and look-up mechanism). In a sub-pixel bitmap, a pixel is defined either by one source, or a list of sources, with weights for each source. The weight of a source is a value that defines how much impact a source has on the color of a pixel or area. This means that at the time of displaying the image, the display process can use different colors and bit depths and optimize the display quality taking the gamma value of the display device into account.

A source is something that defines the color of a given pixel or sub-pixel, when it is displayed on screen, printed, or converted to a normal bitmap for any other purpose. Typically, this is a color defined in a color space appropriate to the use of the sub-pixel bitmap, or a texture where the color defined for individual pixels depends on the placement of the pixel in the sub-pixel bitmap. However, a source can also be an image, a video source, or any other source that can determine the color for a pixel, whether this is a fixed value, or depends on the placement of a pixel, time, or any other input the source uses to determine the color.

To store and transport graphics (such as a digital map) efficiently, the graphic can be divided into tiles, each covering a smaller part of the overall graphic. Each of these tiles can be represented as a sub-pixel bitmap, so that a tile combined with a set of sources can generate a bitmap used to display the part of the graphic that the tile represents. The sub-pixel bitmap's information about the sources and weights can be compressed, for example, with a run-length method that is fine tuned to minimize the data size of the tiles, while keeping the computation needed to uncompress the tiles low. Such a compression technique will be discussed in turn.

An additional level of compression can be applied, when the size of the graphic relative to the speed of uncompressing is deemed more important. This second level can use repetitions and similarities in lengths of the run-length sequences and sources between lines in the bitmap to lower the data size of the individual tiles, by representing each line based on the changes from the previous line.

For purposes of discussion, the techniques described herein for generating, storing and displaying digital graphics are embodied in the context of a digital mapping system. However, it will be apparent in light of this disclosure that the techniques can be applied in numerous applications that call for the generation, storage, serving, and/or displaying of digital graphics.

Further note that functionality described herein may be implemented by computer program instructions. These instructions can be loaded into a computer or other processing environment to produce a machine, such that the instructions are executed to carry out graphics processing techniques in accordance with various embodiments of the present invention. These computer program instructions may also be encoded in a processor-readable medium so as to provide an article of manufacture. Any number of programming languages or combination thereof (e.g., C, C++, HTML) can be used here to implement the computer program instructions. Further note that other embodiments of the present invention can be implemented by purpose-built hardware, such as field programmable gate array (FPGA) or application specific integrated circuits (ASIC) technology. Likewise, combinations of hardware and software can be used to carry out other embodiments of the present invention, as will be apparent in light of this disclosure.

Sub-Pixel Bitmaps in a Digital Mapping System

As previously stated, to store and transport a digital map efficiently, the map can be divided into tiles, each covering a smaller part of the overall map. Each of these map tiles can be represented as a sub-pixel bitmap, so that a map tile combined with a set of sources can generate a bitmap used to display the part of the map that the map tile represents. Various compression techniques can be applied to minimize the data size of the tiles, as will be explained in turn.

In a system where a digital map is stored in one location (e.g., server), and used in another (e.g., client), map tiles represented by sub-pixel bitmaps can be converted to normal bitmaps by the server, and sent to the client as such, using a format that the client can use for displaying or printing. Alternatively, the map can be sent to the client as map tiles represented by sub-pixel bitmaps, and converted to normal bitmaps by the client, or used directly to display or print maps by the client.

In any case, defining a pixel's colors based on multiple sources with weights allows digital maps to be displayed in an anti-aliased form, even when the sources change the colors they define for pixels.

Example tile-based digital mapping systems and associated processing environments are described in detail in the previously incorporated applications titled "A Digital Mapping System" and "Generating and Serving Tiles in a Digital Mapping System." As will be apparent in light of this disclosure, these mapping systems can be configured to represent map tiles as sub-pixel bitmaps in accordance with an embodiment of the present invention.

Sub-Pixel Bitmap Generation

Figure 1:
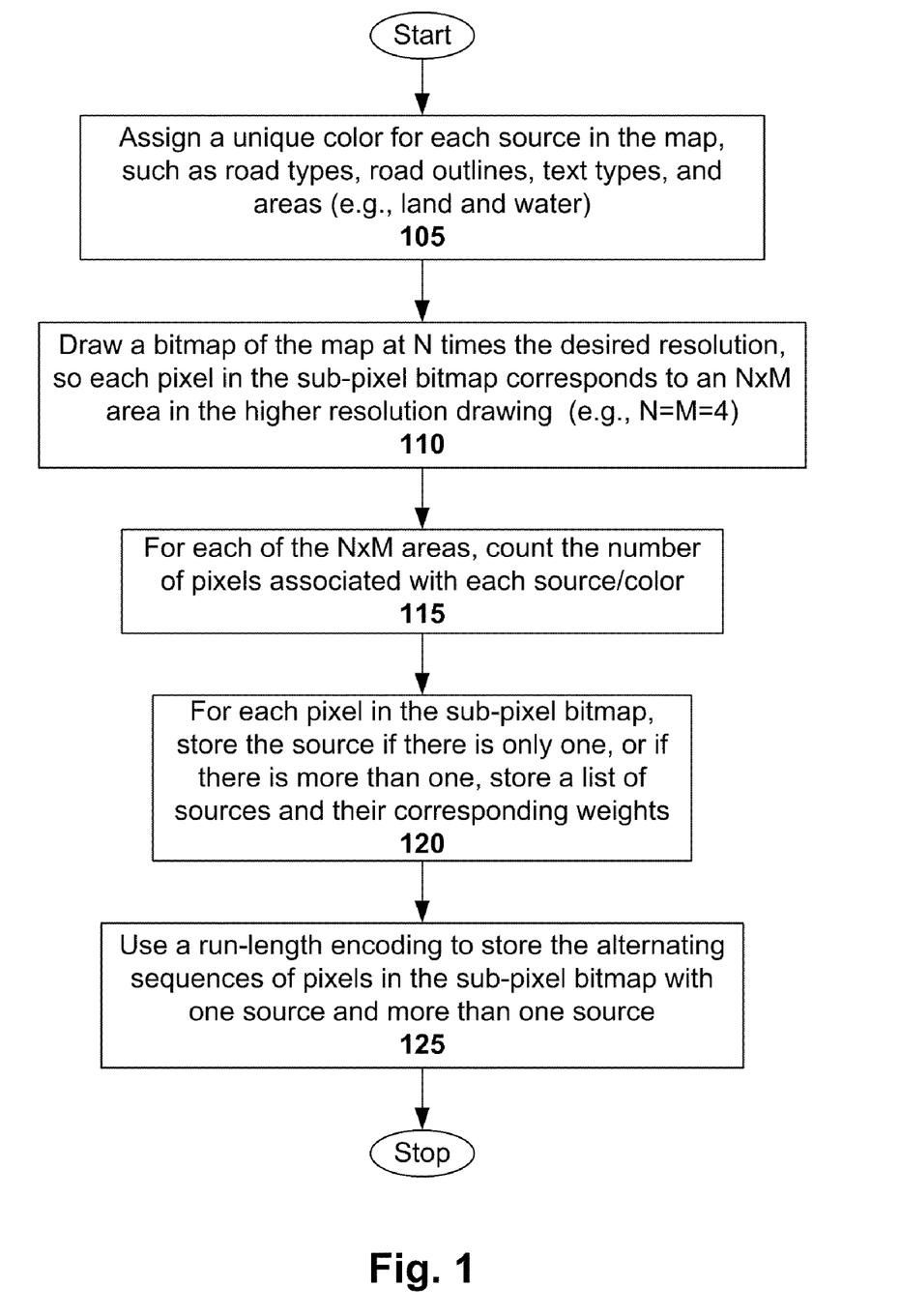
FIG. 1 illustrates a method for generating sub-pixel bitmaps, in accordance with one embodiment of the present invention.

FIG. 1 illustrates a method for generating sub-pixel bitmaps for use in, for example, a tile-based digital mapping system, in accordance with one embodiment of the present invention. This method could be implemented, for example, by programming or otherwise configuring a system for generating map tiles for a digital mapping system as discussed in the previously incorporated application titled "Generating and Serving Tiles in a Digital Mapping System."

In general, to generate a sub-pixel bitmap, the sources that contribute to each pixel in the sub-pixel bitmap are identified, as well as the weight of each contribution. For a digital map, or any other vector based image, this can be done by drawing the map at a higher resolution than the final map that will be displayed on screen, so that each pixel in this higher resolution bitmap has only one source. Then each area in the higher resolution bitmap that covers one pixel in the sub-pixel bitmap has pixels covered by one or more sources, and the weight of each source is the number of pixels that has that source divided by the total number of pixels in the area. It is also possible to calculate the values in a sub-pixel bitmap directly from vectors, or to try to construct it from a bitmap representing the desired outcome, such as a scanned map or a map that is available as a bitmap in the desired size.

In more detail, and with reference to FIG. 1, to generate a sub-pixel bitmap for a map, with a precision level of $\frac{1}{16}$, the following method can be used:

The method begins with assigning 105 a unique color for each source in the map, such as land, water, each road type, road outlines, text types, and areas. Recall that a source defines how a given pixel should look. For most uses, a source is simply something that returns a color, but it can be more, by including information about time, pixel position, and external data when deciding which color to return for a given pixel.

The method continues with drawing 110 the map at N times the desired resolution, so each pixel in the sub-pixel bitmap corresponds to an N×M area in the higher resolution drawing. In this particular example, N and M are both equal to four, which provides the precision level of $\frac{1}{16}$. Note, however, that other embodiments may have N×M areas where N is not equal to M, and the higher resolution can be set as desired. Note that use of the term drawing does not necessarily implicate displaying of the map.

For each of the N×M areas, the method continues with counting 115 the number of pixels associated with each source/color. For each pixel in the sub-pixel bitmap, the method continues with storing 120 the source if there is only one, or if there is more than one, storing a list of sources and their corresponding weights. As previously discussed, the weight of a particular source is the number of pixels that has that source divided by the total number of pixels in the N×M area.

The method proceeds with using 125 a run-length encoding to store the alternating sequences of pixels in the sub-pixel bitmap with one source and more than one source. Thus, the resulting sub-pixel bitmaps are made up of alternating sequences of single source pixels and mixed source or "transition" pixels.

Compression

Figure 2:
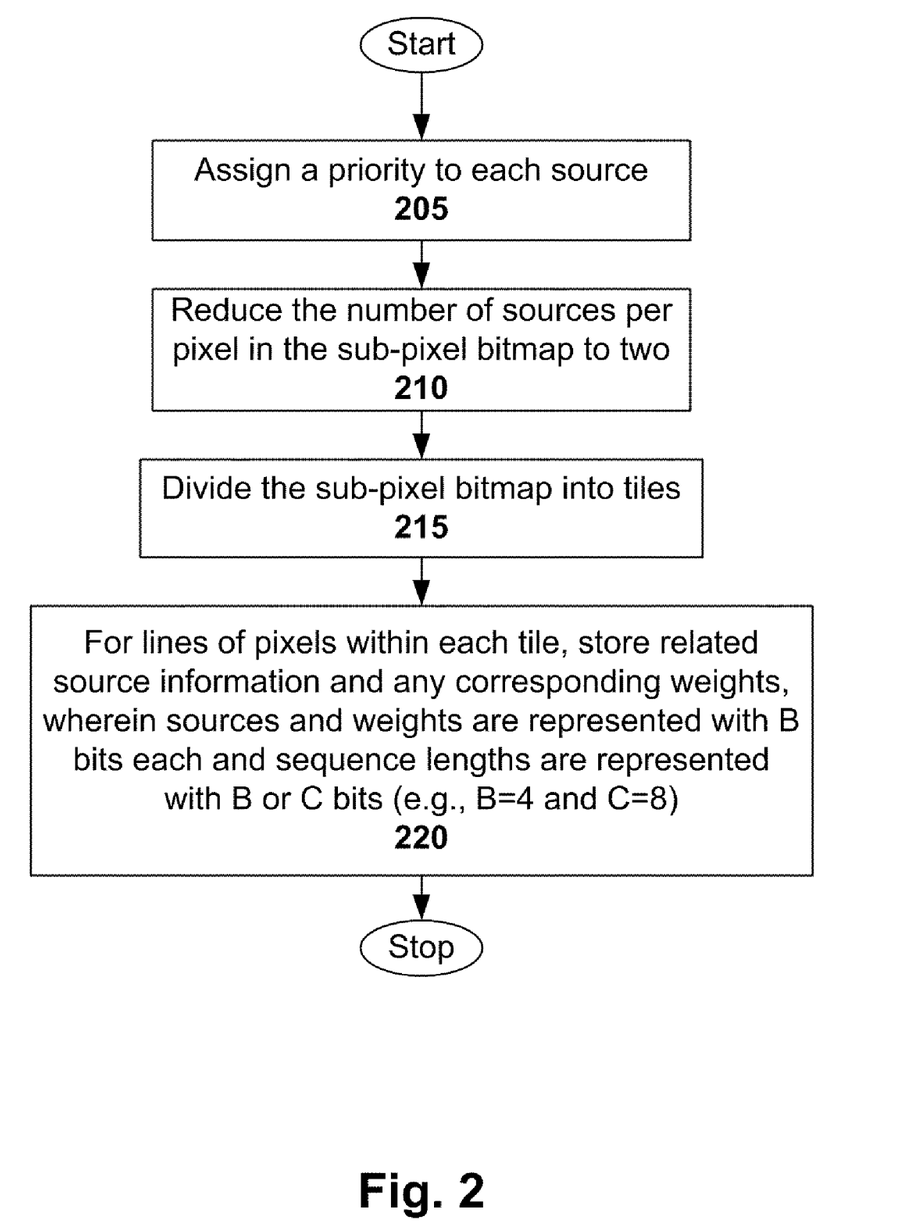
FIG. 2 illustrates a method for improving performance and reducing the size of the resulting maps produced by the method of FIG. 1, in accordance with one embodiment of the present invention.

FIG. 2 illustrates a method for improving performance and reducing the size of the resulting maps produced by the method of FIG. 1, in accordance with one embodiment of the present invention.

Before describing this method, consider the following. When moving along a horizontal line in an anti-aliased map, going from one area to another will change the color over several pixels. So, for instance, when moving from a white area to a black area, there will be a transition with pixels that are increasingly darker. When packing the data in a sub-pixel bitmap, the data describes the alternating between single sources and transitions between sources. Also, pixels on the border between two areas in a map will have colors that are a mix of those two colors, where the mix is defined by how much of a pixel is covered by each color. So if an image is showing black text on a white background, the pixels that are only partially covered by the letters, will have varying degrees of gray, determined by how much of the pixels area is covered by letters.

The method includes assigning 205 a priority to each source, which describes how important the corresponding source is for the usability and readability of the map. To make the sub-pixel bitmaps take up less space, the method continues with reducing 210 the number of sources per pixel in the sub-pixel bitmap to two. For example, when a 4×4 area contains pixels with more than two sources, select the two most important sources, based on priority and how many pixels they cover. Then change the rest of the sources to one of the two selected sources, so that the balance between the two selected sources is maintained as closely as possible. Note that knowledge of the source colors to be used when converting, displaying or printing the sub-pixel bitmaps at this point can be used when reducing the number of sources. For instance, if there are sources in a pixel that will be white, gray, and black when displayed, calculate the average color for the pixel, then drop the gray and adjust the balance between white and black so the resulting color is the same as the calculated average.

The method continues with dividing 215 the sub-pixel bitmap into tiles of a pre-determined size, which in this example is 128×128 pixels. The method continues with, for each line of pixels within each tile, storing 220 related source information and any corresponding weights, wherein sources and weights are represented with B bits each and sequence lengths are represented with B or C bits (e.g., B=4 and C=8; other embodiments will be apparent light of this disclosure). For instance, the representation of a pixel line begins with source1 for length1 pixels, then transitions to source2 over tran2 pixels, each with a weight, then show source2 for length2 pixels, then transition to source3 over tran3 pixels, and so forth until the line is fully defined. This representation is repeated for each line of pixels in a tile. If a pixel in a line goes from a single source directly to another single source, define the transition as having length 0. If the pixels in a line go directly from one pair of sources to another pair of sources, define the lengths of pixels with one source in between as having length 0. If both the sources in the second pair are new, use first a 0 length line of single source pixels, followed by a transition of length 0 and a second line of pixels with a single source with length 0.

In one embodiment, the number of sources is limited to 16, so each source number can be stored using only 4 bits. In addition, 4 bits can be used to represent each weight in a transition. This is possible because when transitioning from one source to the next, the first source will have a weight less than $16/16$, and higher than $0/16$, and therefore only values from 1 to 15 are needed.

Also, the sources used for text can be defined. Here, it can be assumed that text is always transitioning for a certain length before returning back to the color preceding it. Here, a threshold can be set for text that defines how long the source transitioning into the text source can be the only source while still being considered part of the same transition. In an embodiment where the number of sources is limited to 16, a full range of weights from $0/16$ to $16/16$ can be used. In more detail, convert one of the weights to another weight, so the weights can be represented by 16 values, allowing them to be represented using only 4 bits. For lengths of single source pixels and transitions, either 4 or 8 bits can be used, by choosing a threshold value less than 15, and using 4 bits for lengths less than or equal to the threshold, and 8 bits otherwise, with the eight bits interpreted as the first 4 bits value minus the threshold times 16 plus the last four bits value. This allows the processor/reader to take four bits, and see if it's a 4 or 8 bit length, and if it is an 8 bit length then take the next 4 bits. The threshold should be chosen taking the nature of the map into account, in particular the distribution of lengths of single source pixels sequences and lengths of transitions.

Based on the method of FIG. 2, the sub-pixel bitmap can be represented as, for each line of a tile, the source that starts each line, followed by as many sets as needed of: the length of the sequence of pixels with the current source; the next source used; the length of the transition to the next source; and the weights used in the transition, where source numbers and weights are using 4 bits each and lengths are using 4 or 8 bits.

Secondary Compression

To make the tiles even smaller, a secondary compression method can be used that defines the lengths and sources in each line following the first by the changes from the preceding line, if there are any such changes. This secondary compression can be used when size is relatively more important than decompression time (e.g., when moving tiles over a network or storing them on the server). In such a case, the tiles can be partly decompressed when they are stored in a place where the decompression times are more important (e.g., when the tiles are in the client cache or pre-fetched in memory).

In one embodiment, if this secondary compression method is used, but the image has more than 16 sources, select a number less than 16, and use that number of sources as normal. Then use the rest of the 16 sources in a way that each time a source number not included normally is needed in a pixel in the sub-pixel bitmap, one of the source numbers beyond the number chosen is used, and this is then followed by 4 or 8 bits defining which of the extra sources is being used. Use 4, 8 or more bits to define the extra sources, depending on how many sources are associated with the image to be displayed or printed.

If the number of normal sources is less than 15, an additional saving can be achieved by applying the following logic: when a number beyond the normal source numbers is encountered, that number will only be followed by a new source number, represented by 4 or 8 bits, if the number has not been used previously in the tile, and all the other numbers beyond the normal source numbers have been used more recently. For example, if the chosen number of normal sources is 13, there are three extra source numbers. Thus, a tile can now alternate between two extra source numbers once they have been attached to two of the extra numbers, without repeatedly using the 4, 8 or more bits, and still change which extra sources are used by using the third of the extra source numbers. This can be used to include, for instance, signs in a map, where the colors used in the signs vary greatly in different parts, without needing more than 4 bits per pixel to describe the sources in most cases, thereby reducing the amount of storage needed for storing the sub-pixel bitmaps.

When the tiles containing sub-pixel bitmaps need to be displayed, or converted into normal bitmaps, the sources need to be available. If each source is simply a color, then each source is that color represented in the color space to which the sub-pixel bitmap is being displayed in or converted. This could be, for example, a 16 or 24 bit RGB representation for screen display, 8 bits if using grayscale or indexed colors or CMYK values for printing. Since pixels in the sub-pixel bitmap can have more than one source, some pixels result in colors that are a mix of two or more sources. In one particular embodiment, if the sub-pixel bitmap has been reduced to only contain one or two sources per pixel, and the sources used to display or convert the sub-pixel bitmap are colors, then a table can be generated and stored with not just the colors of the sources, but also the results of mixing any combination of two colors, in all the possible combinations. If the precision of the sub-pixel bitmap is 1/16, this means that 15 mixed colors are needed for each possible transition between two colors. This table can then be used to display or convert the sub-pixel bitmap, without having to recalculate the mixed colors each time a pixel has more than one source.

With such a color table, a sub-pixel bitmap can be displayed or converted by running through the data in the sub-pixel bitmap, and drawing or storing the alternating sequences of single source pixels and mixed pixels, taking the colors and mixed colors from the sources and tables respectively.

If the number of sources per pixel in the sub-pixel bitmap has not been reduced to two, then another approach can be used, instead of having a color table with each mixed color. Here, for each source, the color values multiplied with the weight for all levels of coverage can be stored. In such a case, each pixel's color is either the one source, or the sum of the values from each source that corresponds to their weight. Note that sources with a weight of zero will not contribute to the color of the pixel.

When sources are more than just a fixed color, the color of a pixel that is being displayed or converted can either be fetched from a single source, or calculated as the weighted sum of all the sources defining the pixel. Such sources can return colors based on time, location of the pixel, images and textures, video, or any other definition of something that should show up as an area on a map or similar types of graphics.

Using Sub-Pixel Bitmaps for Maps

FIGS. 3a-3f illustrate the use of sub-pixel bitmaps for maps, in accordance with one embodiment of the present invention.

Figures 3A, 3B:
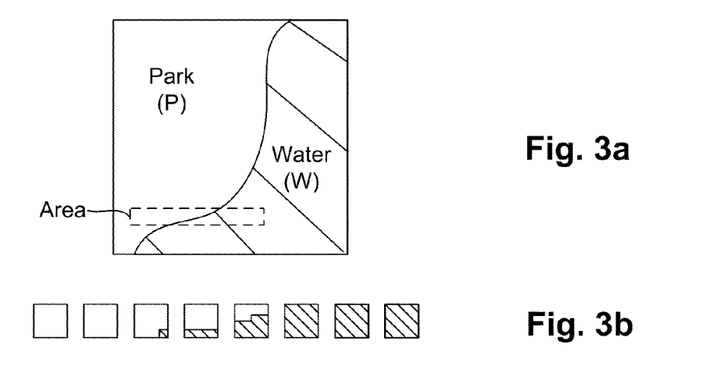
FIGS. 3a-3f illustrate the use of sub-pixel bitmaps for maps, in accordance with one embodiment of the present invention.

To use sub-pixel bitmaps for maps, in accordance with an embodiment of the present invention, let each type of area in the desired map image be a source, such as land, water, freeways, railroads, road outlines, and text labels. In the example of FIG. 3a, the map area has two sources defined by vector data: park (P) and water (W). The area that will become a row of P pixels wide in the actual map, is then drawn as a bitmap N times the size of the actual map (assume for this example that N=4). So the area is divided into P pixels areas, each being 4×4 pixels, that will each be used to determine the sources and weights for the pixels in the sub-pixel bitmap. In the example of FIG. 3b, the number of pixels P is equal to 8, and N is 4. Note, however, that other values for P and N will be apparent in light of this disclosure, and the present invention is not intended to be limited to any one such embodiment. Also, the P pixels can be represented using N×M pixels (of the higher resolution drawing).

Figure 3C:
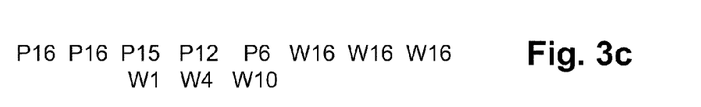

The sub-pixel bitmaps are then generated so that each pixel is defined as belonging to one or more of these sources, with weights. The result is a way of representing the map, after it has been determined how the different sources in the map are covering the pixels, that allows the sources to change colors for display or printing without changing the sub-pixel bitmap. This technique is efficient compared to other ways of storing the rendered map as a bitmap, and is very fast to display, print, or convert to an normal bitmap. In the example of FIG. 3c, the sub-pixel bitmap data for the row of 8 pixels is shown. As can be seen, the 8 pixels include: P16 (source includes park only with a weight of 16); P16 (source includes park only with a weight of 16); P15/W1 (sources include park and water with respective weights of 15 and 1); P12 and W4 (sources include park and water with respective weights of 12 and 4); P6 and W10 (sources include park and water with respective weights of 6 and 10); W16 (source includes water only with a weight of 16); W16 (source includes water only with a weight of 16); and W16 (source includes water only with a weight of 16).

Figure 3D:
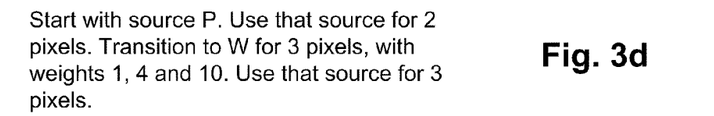
Figure 3E:
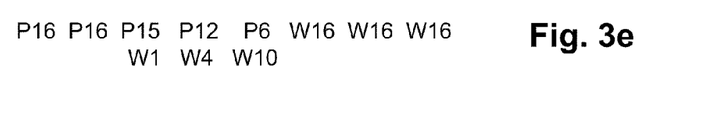

A run length representation of the sub-pixel bitmap data of FIG. 3c is shown in FIG. 3d, in readable form. As can be seen, the representation is: start with the park source (P), and use that source for two pixels. Then transition to the water source (W) over three pixels with weights of 1, 4, and 10. Then, use that source W for three pixels. Note that the total weight for each pixel is 16, whether a single source pixel (e.g., P16 and W16) or a multiple source transition pixel (e.g., P15/W1, P12/W4, and P6/W10). Thus, the impact of each source on each pixel is represented. The reconstructed sub-pixel bitmap data for this example is shown in FIG. 3e.

Figure 3F:
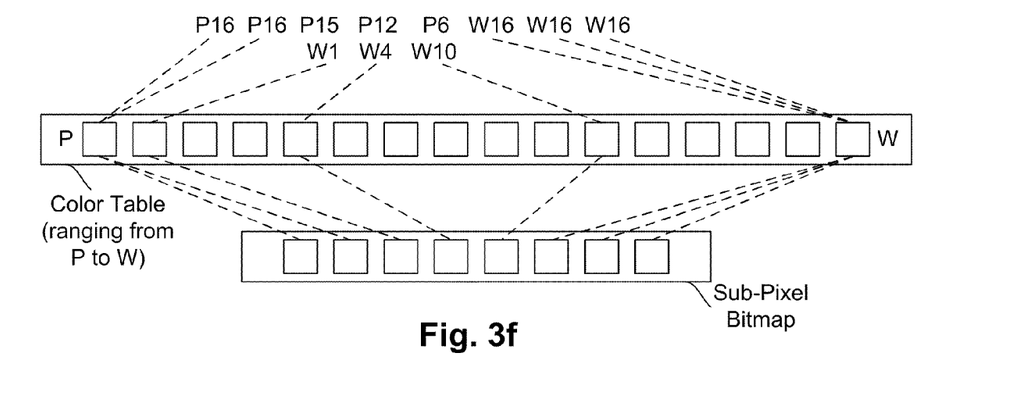

The sub-pixel bitmap data is then combined with a color table containing the single source colors park (P) and water (W), as well as the multi-source or "weighted" colors between the single source colors. In the example of FIG. 3f, there are 15 weighted colors between the single source colors. Thus, the color table in this example has a total of 17 color entries. Other weight and color matching schemes are possible here, and the present invention is not intended to be limited to any one particular such scheme. In this example, the process produces a sub-pixel bitmap that includes 8 pixels with the transitional colors used to display the map.

By dividing the sub-pixel bitmap into tiles, parts of the map can be accessed directly, allowing the map tiles to be placed on a server that then transmits them to a client on request. To make the server fast, a map for a whole area can be saved as map tiles represented as sub-pixel bitmaps, saving the server from having to access map data and generate maps on request.

Using sub-pixel bitmaps also makes it possible to have the same map tiles displayed in a wide variety of ways, simply by changing the sources used to display, print or convert them. These variations include colors, color space, bit-depth, textures and more. It is also possible to join different sources, by having both sources return the same values, which enables a number of map display options. For instance, a road with an outline can be shown as a narrower road without outline by letting the source for the outline return the same values as the background around the road. Alternatively, it can be shown as a wider road centerline without outline by letting the outline source return the same values as the road surface source.

Text on roads can be hidden by letting the text source return the same values as the road's source. Even areas that are meant to be displayed with the same color can be defined as different sources, allowing them to be displayed differently when the sources return different values or the same when the sources return the same values. So for instance, if major and minor roads both have black text labels, giving the labels different sources allows the map to be displayed with or without the text labels for the minor roads, by changing the source for these text labels between black and the road color for minor roads.

One way to generate the sub-pixel bitmaps for a map in accordance with an embodiment of the present invention is to use the standard ways of drawing maps, while assigning one unique color to each area/source, and drawing the map larger than the final map is supposed to be displayed. Then, for each pixel in the sub-pixel bitmap, find the area in the drawn map that corresponds to that pixel's area and count the occurrences of each color. Since each color is tied to one source, this provides the input needed for the sub-pixel bitmap. In this way, the colors used to draw the large map are only used to determine which areas cover which pixels and by how much. They have no influence, however, on the actual colors used to display or print the map. Rather, these actual colors are determined by the sources used to display, print or convert the sub-pixel bitmap. The size at which the map is drawn determines the precision of the weights in the sub-pixel bitmap. To use the techniques previously described, drawing the map at four times the intended size is enough to get the needed weights, since each pixel in the sub-pixel bitmap corresponds to a 4'4 pixel area in the drawn map. If desired, the maps can be drawn even bigger, improving the precision of the weights, both if the weight are stored with a higher precision than $\frac{1}{16}$ and if they only are stored with $\frac{1}{16}$ precision.

Serving Maps Using Sub-Pixel Bitmaps

To serve a map using sub-pixel bitmaps in accordance with an embodiment of the present invention, place all the tiles on a storage medium, and allow them to be transmitted to a client on request. Such a map tile serving system is discussed in detail in the previously incorporated application titled "Generating and Serving Tiles in a Digital Mapping System." Having the map saved on the server in tiles containing sub-pixel bitmaps means the server does not have to go through the steps of accessing geographical data, drawing a map based on the data, and converting that map into a standard bitmap format prior to transmitting it to the client. This allows the map serving to be much more responsive, when the client requests map tiles represented as sub-pixel bitmaps. A server is any system or device that is capable of delivering data to another system or device, here typically a computer on a network that lets other computers request and receive maps. A client is any system or device that is capable of receiving and displaying maps, here typically a computer on a network, or a smaller device that can request maps in some way.

Even if the client that displays the map does not handle map tiles containing sub-pixel bitmaps, the performance of a map server can be improved by using map tiles represented as sub-pixel bitmaps. For example, assume that a client requests an area. In response, the server accesses the map tiles needed for the area, converts the tiles into a normal bitmap format using a set of sources, and transmits the combined result to the client. Note that the client can also request individual tiles, which are then converted and sent to the client. In that case, the conversion makes it possible to serve tiles in different formats and using different color schemes, while only storing one copy of the map, represented as sub-pixel bitmaps.

The server can have access to all the tiles needed for a specific area, convert the tiles to information about sources and weights, crop the information to exactly match the requested area, and generate a new sub-pixel bitmap based on the cropped information, and serve that to the client. This is particularly useful if the use of bandwidth, client storage, processing power and the size of the client display is limited, as for instance when serving maps to a cell phone or other handheld device, since only the exact area that is needed on the client is transmitted and stored on the client.

In one embodiment, accessing map tiles from local storage on the server can be made more efficient, by saving multiple tiles in single files, and keeping track of which tiles are saved and where. By letting tiles that are adjacent in the map be stored in a single file, the number of seek operations needed to serve a set of tiles to a client can be reduced, assuming the server keeps the whole file in cache memory for a while, and retrieves data from cache memory when it is available in memory before accessing the local storage. So, when a tile is requested, the server determines which file it is in, checks if that file is already in cache memory, and if so, transmits the tile from there. If the file the tile belongs to is not in cache memory, then the server reads that file in from the local storage, and then transmits the tile from there and keeps the file in cache memory as long as possible (e.g., until it gets pushed out to serve other tiles). This way, when a server requests a set of tiles in the same area, the number of times the server has to access local storage is reduced.

To further reduce the response time of the server, when saving a set of tiles, the order of the tiles in the file can be such that they are read in a spiral starting from the outside of the area and spiraling inwards. This way, when a client moving through a map is approaching the area in a file, the tiles that are first requested because they are on the outer edge of the area are the ones placed first in the file, independent of which direction the area is approached from by the client. In one such embodiment, if the local storage on the server benefits from it, save the files containing spirals in larger files, and access the individual spirals directly, without reading the entire file. In this particular case, index information can be stored describing where each spiral begins separately from the files containing the spirals. This index information can be loaded into cache memory for the surrounding areas when a client has requested a tile in a given area, so the next request close to the first does not require loading the index information again. If possible, keep all index information in cache memory to reduce response time. The size of the cache can be set accordingly.

In another embodiment, to make the response of the map tile serving system faster for a client that needs more than a single map tile, a client request is allowed to contain a list of needed tiles. Here, the server transmits all the tiles as a single response to such a request. To further enhance the performance, the client is allowed to modify the list of tiles while it is being transmitted, if for instance the user of the client has moved to a different part of the map. Such a modification can be, for example, in the form of a new request, referring to the previous request, or a command sent to the server from the client. The server then informs the client of which tiles from the original request will be dropped and which tiles will be added, either by responding to the second request with the information, or by having the response containing the tiles precede each tile with data describing which tile is next.

Pre-Fetching and Caching

To make navigation of a map more responsive when a client is getting map tiles from a server or from any location from which getting the tiles causes delays in the display of the map, the client can be configured to pre-fetch and cache the tiles, in accordance with another embodiment of the present invention.

In one particular case, pre-fetching means the client first gets the map tiles that are needed to draw the currently visible part of the map, and then continues to get the all tiles surrounding the visible area within a pre-determined distance, as well as the tiles that would be needed to show the map at zoom levels above or below the current zoom level. The pre-fetched tiles are kept by the client and are thus ready to be displayed instantly if the user navigates into the area surrounding the currently visible area. As the user navigates the map, the client constantly pre-fetches the surrounding areas and zoom levels, as soon as all the visible tiles have been retrieved, making the map display more responsive.

Caching means the client is using local storage, such as a hard drive or cache memory (e.g., RAM), to store the map tiles it receives from the server, and checks this cache for a given tile before requesting it from the server. So any tile that has been displayed or pre-fetched once is present in the cache (unless it has been pushed out by other more recently viewed tiles, particularly in an embodiment where the cache size is fixed or otherwise limited), and therefore it can be displayed faster than if it would have to be requested from the server.

The cache can have a fixed size limit, and if so the tiles that are least likely to be needed again, based on various criteria (such as time since last use, frequency of use, distance from normally navigated areas etc.), can be deleted to make room for new tiles as they are received from the server. To make the caching as efficient as possible, instead of saving individual tiles, a set of adjacent tiles can be saved in a single file, where the index information associated with that file is stored separate. Here, the same spiraling pattern as on the server can be used, but allow some tiles in the spiral to be missing, if they are not in the cache. Each time a map tile from a file is requested, load the whole file into memory, and add new tiles that are received from the server. If new tiles in the area have been received from the server, and the client navigates away from the area or if the memory used is needed for something else, then save all the map tiles in the area again in the order based on the spiral, and update the file index information accordingly.

Gamma

Display devices emit light based on values defining the color of a pixel, but the amount of light emitted is normally not a linear function of the binary value for RG and B. Instead, a gamma value is used so that, for instance, the red light emitted from a pixel is the value (L*R^gamma), where L is some fixed amount of light and gamma typically is in the range from 1.6 to 2.2 for a computer display. Generally stated, display devices use a gamma value to determine how much light should be emitted from a pixel, based on the input value for that pixel.

In one embodiment, to get the most correct color for a pixel with more than one source, the color is calculated based on the colors defined by the sources, the weights and the gamma value used by the display. The gamma value for a display defines how much light is emitted by a pixel, based on the R, G and B values of the pixel. For example, if a pixel is defined by two sources, each with 50% weight, the pixel's colors can be calculated as the sum of 50% of each color value. But since the actual light output of a pixel is defined by value ^ gamma, this is not correct. By using the formula:

$$R=((W1*R1\hat{}Gamma)+(W2*R2\hat{}Gamma))\hat{}(1/gamma)$$

to calculate the red value (R) for a pixel where the color is defined by two sources as R1 and R2 with weights W1 and W2, the R value is the same as the amount of red light that would have been emitted from the pixel on the screen, if it had been partially emitting red light with the values R1 and R2 divided by the weights W1 and W2. The same formula can be used to calculate the green (G) and blue (B) values, and expanded when there are more than two sources for a pixel.

Instead of going through this type of calculation for each pixel in a sub-pixel bitmap, the calculations can be done once, when tables with mixed colors for transitions are generated as previously discussed, or when the colors multiplied with weights are calculated when pixels can have more than two sources.

High Resolution Printing

In accordance with another embodiment, when a map is stored using sub-pixel bitmaps, the map can be displayed on a screen with each pixel either defined by one source, or defined by the result of combining multiple sources, based on their weights. This makes it possible to display an anti-aliased map on the screen, and the same anti-aliased map can be used for printing. But for printing, having a higher resolution bitmap without anti-aliasing will produce better results (this is because printers generally can produce images with a higher DPI than displays).

To achieve this, a supplemental printing tile can be generated with the sub-pixel bitmap tiles. The supplemental printing tiles contain information for the pixels in the sub-pixel bitmap that have references to more than one source. For each of these pixels, the information describes which part of the pixel is defined by which source. Combining a map tile with the corresponding supplemental printing tile results in a higher resolution bitmap without anti-aliasing, which can be used for high resolution printing.

If the sub-pixel bitmap is reduced to only contain one or two sources for each pixel, the supplemental printing tiles only need a single bit for each pixel at the higher resolution. So if the original map was drawn at 4 times the size to generate the sub-pixel bitmaps, the supplemental printing tiles can use each 4×4 pixel in that bitmap to define which sub-pixels in the sub-pixel bitmaps belongs to which source. So a supplemental printing tile for a tile based on a 4× map drawing that has been reduced to a maximum of two sources per pixel, contains 16 bits per pixel in the tile that has two sources. If pixels in the tile can have more than two sources, more than one bit per sub-pixel will be needed. Further note that if the sub-pixel bitmap is generated based on a map that is more than four times larger than the map in the sub-pixel bitmaps, then even a higher resolution can be defined by the supplemental printing tiles, making the print quality even higher.

Figure 4A:
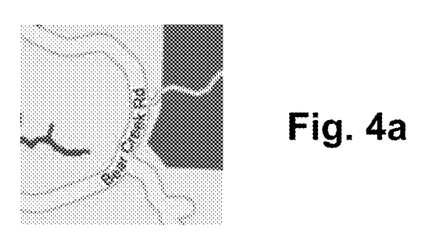
FIGS. 4a-4c depict an example set of map tiles of different resolutions for high-quality printing of map images, in accordance with one embodiment of the present invention.
Figure 4B:
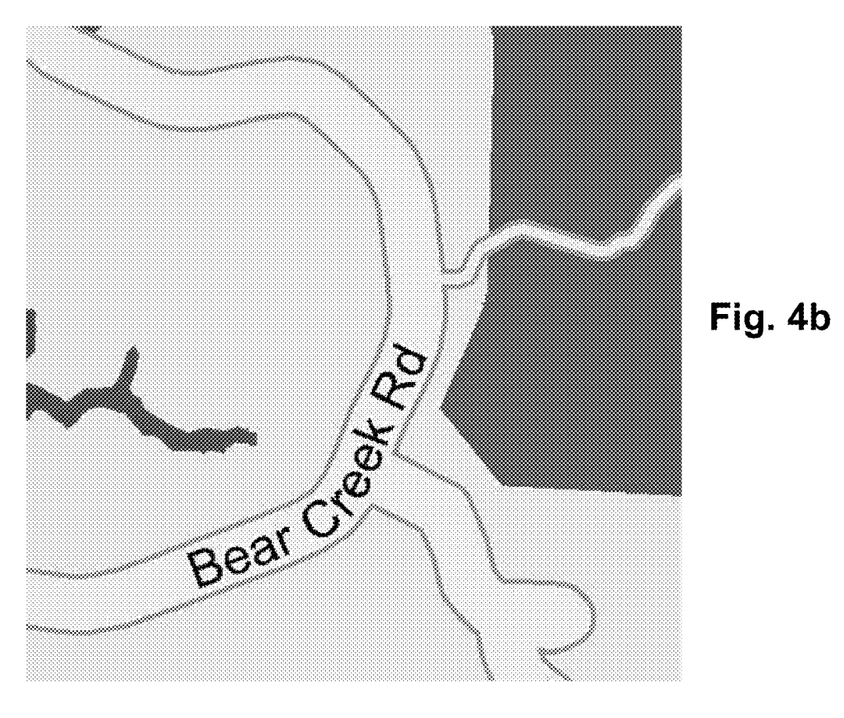
Figure 4C:
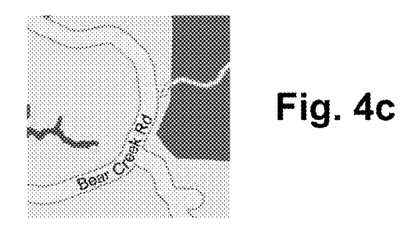

Thus, to achieve higher-quality hardcopies of map images in one embodiment, map views can be re-assembled using print resolution tiles. FIGS. 4a, 4b, and 4c depict an example set of map image tiles of different resolutions for high-quality printing of map images according to one embodiment of the present invention. Because one such embodiment uses HTML IMG elements to place tiles in the tile grid, two images of the same map tile, with one at size 128×128 pixels (FIG. 4a), and the other of size 512×512 pixels (FIG. 4b) may be used for display and printing purposes, respectively. FIG. 4c is a high-resolution version of the image shown in FIG. 4a. Note the lack of clarity or crispness in the text in FIG. 4a compared to the text in the high resolution print of FIG. 4c. Using this observation, in response to a print request from a user, the current map view may be re-assembled using print-resolution tiles to achieve a superior print output.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A sub-pixel bitmap tile serving system configured to serve tiles in response to requests from a user, comprising:
    a plurality of front end tile servers for serving one or more sub-pixel bitmap tiles requested by a user;
    a request distributor for distributing requests for sub-pixel bitmap tiles between the plurality of front end tile servers; and
    a plurality of back end tile servers communicatively coupled with the plurality of front end tile servers, each back end tile server having access to the sub-pixel bitmap tiles, and configured to provide requested sub-pixel bitmap tiles to a corresponding front end tile server.

2. The system of claim 1 wherein the user uses a processing device to request sub-pixel bitmap tiles, and the system is configured to cache sub-pixel bitmap tiles on the processing device.

3. The system of claim 1 wherein the system is configured to pre-fetch sub-pixel bitmap tiles, so that tiles needed to draw a requested graphic represented by one or more sub-pixel bitmap tiles, as well as a number of sub-pixel bitmap tiles surrounding the requested graphic within a pre-determined distance, are served to a user.

4. The system of claim 3 wherein sub-pixel bitmap tiles associated with one or more zoom levels are also pre-fetched and served.

5. The system of claim 3 wherein the user uses a processing device to request sub-pixel bitmap tiles, and pre-fetched tiles are cached on the processing device.

6. The system of claim 3 wherein sub-pixel bitmap tiles that are least likely to be used, based on established criteria, are deleted from the cache.

7. The system of claim 3 wherein caching sub-pixel bitmap tiles includes caching a set of adjacent tiles in a single file, where index information associated with that file is stored separately.

* * * * *